United States Patent [19]
Anton

[11] Patent Number: 5,281,986
[45] Date of Patent: Jan. 25, 1994

[54] LATCHING MECHANISM FOR OVERHEAD PROJECTOR POST

[75] Inventor: William J. E. Anton, Austin, Tex.

[73] Assignee: Minnesota Mining and Manufacturing Company, St. Paul, Minn.

[21] Appl. No.: 42,146

[22] Filed: Apr. 2, 1993

[51] Int. Cl.⁵ .............................................. G03B 21/00
[52] U.S. Cl. ................... 353/63; 353/DIG. 6; 353/DIG. 3; 353/119
[58] Field of Search ..... 353/DIG.6, DIG. 3, DIG. 4, 353/119, 65, 63, 66, 64

[56] References Cited

U.S. PATENT DOCUMENTS

| | | | |
|---|---|---|---|
| 3,244,069 | 4/1966 | Field | 353/DIG. 3 |
| 3,515,476 | 6/1970 | Field et al. | 353/DIG. 3 |
| 3,653,754 | 4/1972 | Yamanaka | 353/61 |
| 4,449,800 | 5/1984 | DeLongis et al. | 353/119 |
| 4,588,271 | 5/1986 | Emura | 353/66 |
| 4,696,557 | 9/1987 | Tomizuka | 353/66 |
| 4,776,688 | 10/1988 | Ushiro et al. | 353/66 |
| 4,795,252 | 1/1989 | Kyhl | 353/DIG. 6 |
| 4,938,587 | 7/1990 | Namioka et al. | 353/66 |
| 4,968,134 | 11/1990 | Shimizu et al. | 353/119 |
| 4,969,733 | 11/1990 | Jewison | 353/119 |
| 4,978,218 | 12/1990 | Carpenter | 353/DIG. 4 |

FOREIGN PATENT DOCUMENTS

| | | |
|---|---|---|
| 2828245 | 1/1980 | Fed. Rep. of Germany ... 353/DIG. 6 |
| 3519506A1 | 12/1986 | Fed. Rep. of Germany .... G03B 21 |
| 3627740A1 | 2/1988 | Fed. Rep. of Germany .... G03B 21 |
| 3827059A1 | 2/1990 | Fed. Rep. of Germany .... G03B 21 |

Primary Examiner—William A. Cuchlinski, Jr.
Assistant Examiner—William C. Dowling
Attorney, Agent, or Firm—Gary L. Griswold; Walter N. Kirn; Daivd W. Anderson

[57] ABSTRACT

An automatic latching mechanism for the post of an overhead projector includes a spring-biased collar slidably disposed on the post and a cam which lifts the collar as the post is raised and releases the collar to engage a retaining tang when the post reaches a position necessary for projection.

4 Claims, 3 Drawing Sheets

LATCHING MECHANISM FOR OVERHEAD PROJECTOR POST

FIELD OF THE INVENTION

The present invention relates to overhead projectors having movable posts which are pivotable between a storage position and a projection position.

BACKGROUND OF THE INVENTION

A typical transmissive type overhead projector, generally indicated as 10, is depicted in FIG. 1 and includes a base 12, a projection head 14 and a post 16 connecting the base 12 and the projection head 14. The post 16 is pivotable between the illustrated upright projection position and a storage position wherein the post 16 is rotated forward and down to engage a clip 18. The post 16 includes a collar 20 which may be slid relative to the post 16 to engage a tang (not shown in FIG. 1) attached to the base 12 when the post 16 is in the upright, projection position. The user of the projector 10 is required to lift the collar 20 from engagement with the tang when it is desired to move the post 16 to the storage position and push the collar 20 down into engagement with the tang after the post 16 has been moved to the projection position to maintain the post 16 in this projection position.

It has been found that the collar 20 has not been used regularly in the past, resulting in instability and possible incorrect positioning of the post 16 and it is desired to provide a collar which is automatic in its use so that the post 16 will be reliably and securely positioned in the upright position.

SUMMARY OF THE INVENTION

The objective of the invention is accomplished by providing a post latching assembly adapted for use with an overhead projector having a post pivotally attached to the projector and movable between a storage position and a projection position, the latching assembly including a tang attached to the projector, a collar slidably connected to the post and movable between a position engaging the tang when the post is in the projection position and a position free of engagement with the tang, biasing means for urging the collar in a direction toward engagement with the tang, means including a cam attached to the projector for sliding the collar away from the tang-engaging position as the post is moved from the storage position to the projection position and for permitting the collar to slide into engagement with the tang in response to the biasing means when the post has been moved to the projection position.

The post latching assembly includes means for limiting movement of the collar relative to the post, this limiting means preferably being a screw driven into the post, and a handle formed as part of the collar for lifting the collar from the tang. The biasing means is preferably a compression spring.

BRIEF DESCRIPTION OF THE DRAWINGS

The present invention will be more particularly described with respect to the accompanying drawings, wherein like numbers refer to like parts in the several views, and wherein.

DESCRIPTION OF THE PREFERRED EMBODIMENT

Figure 1:
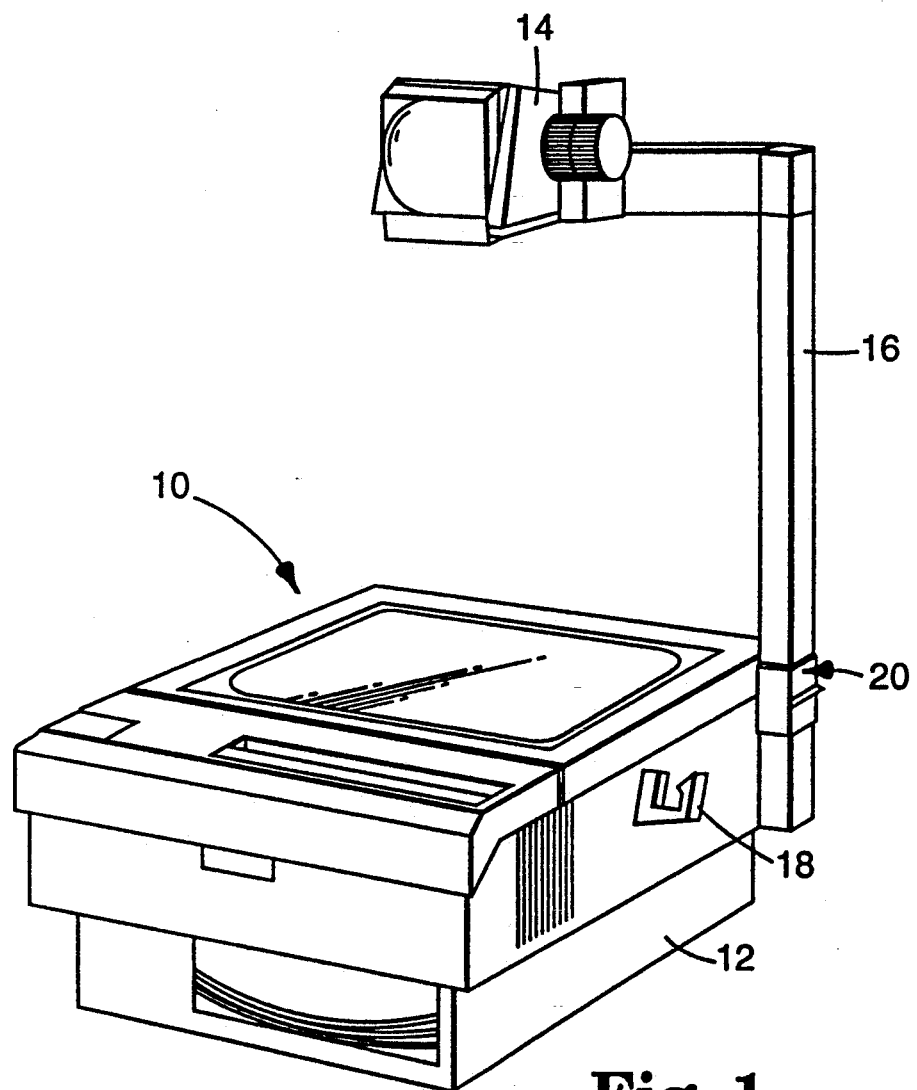
FIG. 1 is a perspective view of a conventional overhead projector.

FIG. 1 illustrates a conventional transmissive overhead projector 10 including a base 12, a projection head 14 and a post 16 which supports the projection head 14 in the projection position above the base, as illustrated. The post 16 may be pivoted between the projection position and a storage position wherein the post 16 rests in a clip 18 attached to the side of the base 12 of the projector 10. The post 16 includes a collar 20 which may be slid relative to the post 16 and which includes a pocket 22 (best seen in FIG. 3) which engages a tang 24 (best seen in FIG. 2) to maintain the post 16 in the projection position relative to the base 12.

It has been found that this conventional construction led to problems in that the collar 20 could be slid to a position adjacent the pivot point of the post 16 so that it could not engage the tang 24 when the post 16 was upright or the collar could simply be left at a position above the tang 24 if the user did not think to slide the collar 20 down into engagement with the tang 24. In either case, the post 16 was unstable in its relationship to the projector base 12 and could fall to its storage position.

Figure 2:
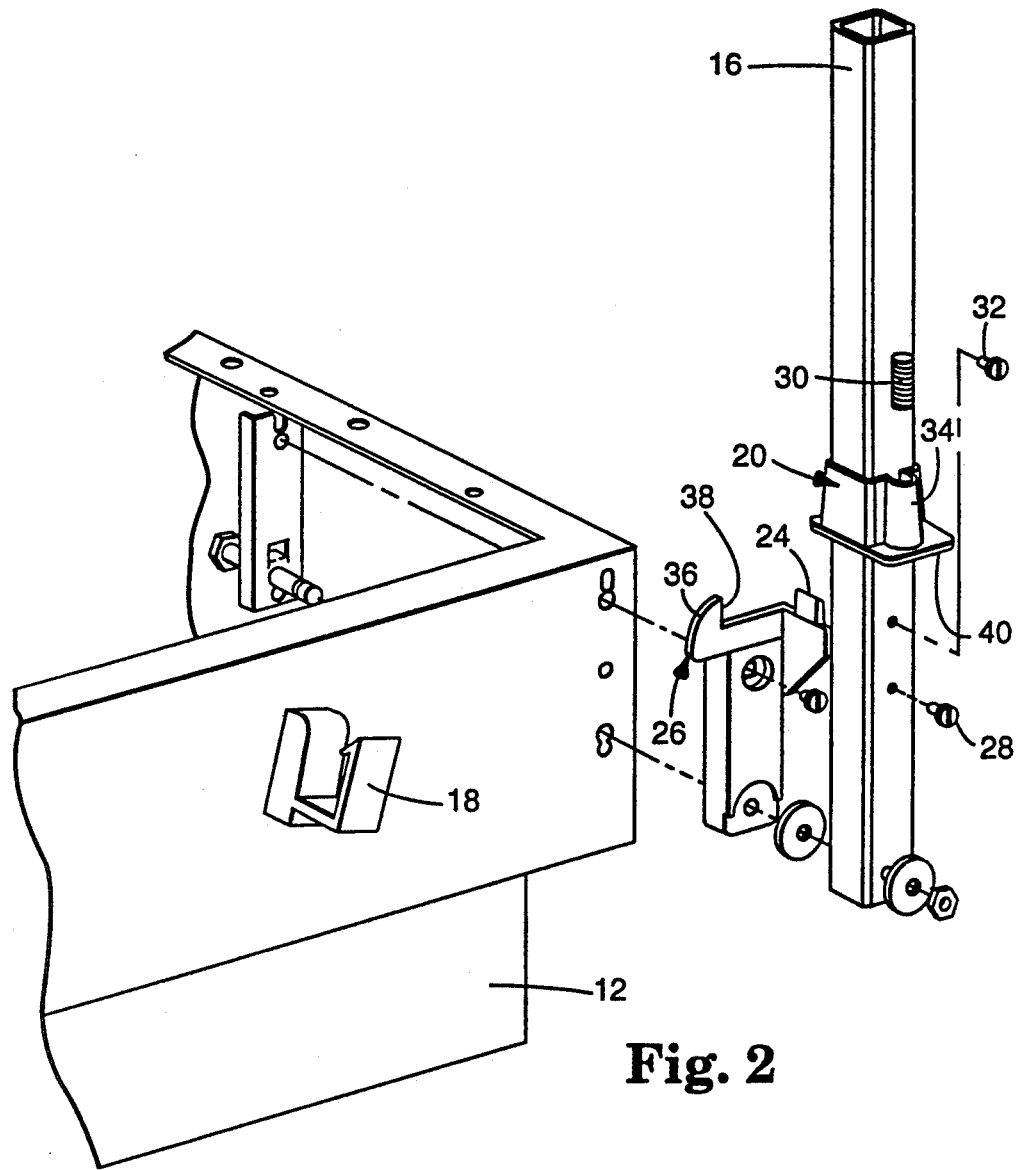
FIG. 2 is an exploded, perspective view of a portion of an overhead projector and a post latching assembly according to the present invention.
Figure 3:
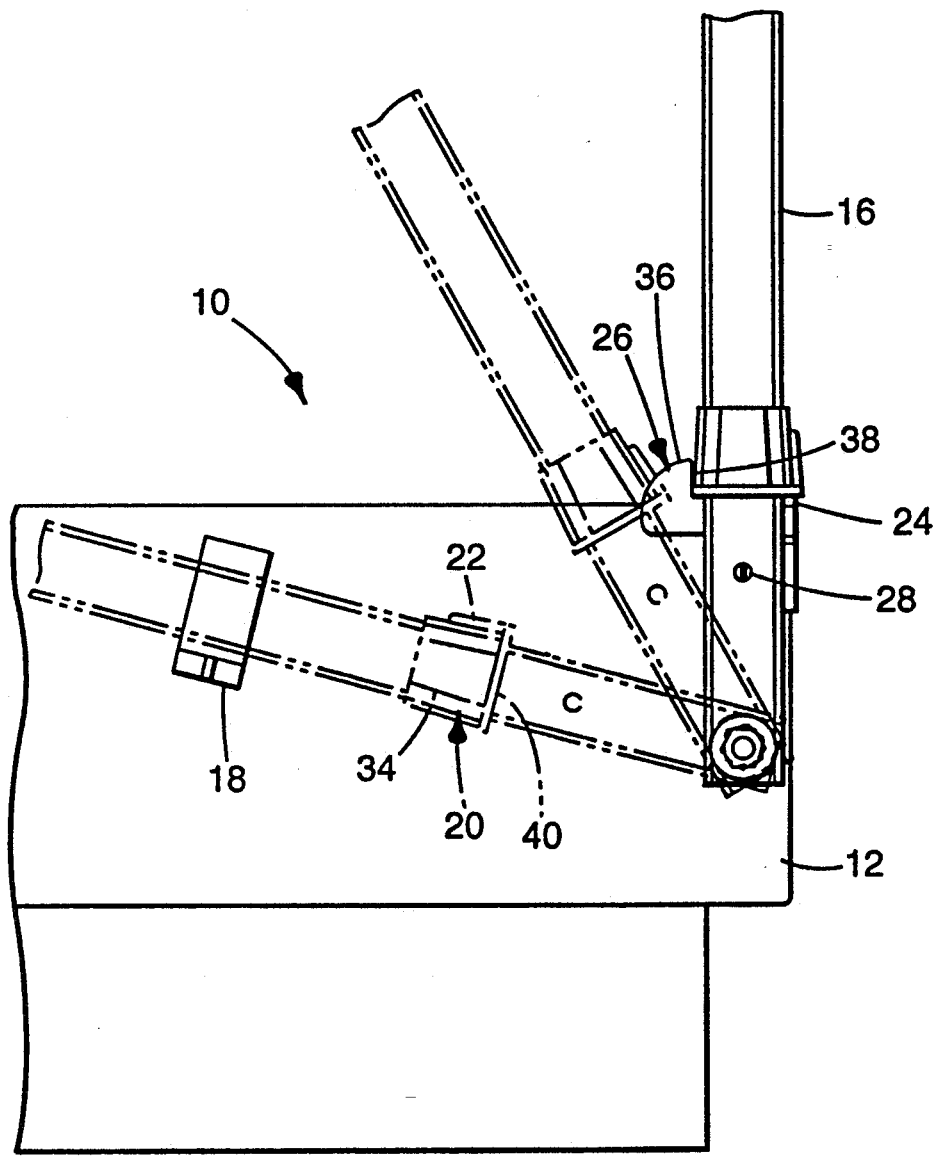
FIG. 3 is a side elevational view of an overhead projector including the post latching assembly of the present invention shown in various positions.

To ensure engagement of the collar 20 with the tang 24, features defining the present invention were added to the conventional projector 10 described above. With reference to FIG. 2, the features added include a cam 26, a stop screw 28, a spring 30 and a retaining screw 32. The collar 20 was modified by the addition of a bulge 34 in its side to accommodate the spring 30. The spring 30 is a helically wound, compression spring which is captured between the retaining screw 32 and a flange (not shown) which extends substantially to the post 16 under the bulge 34. The spring 30 thus urges the collar 20 downward toward the pivot of the post 16. This downward movement of the collar 20 is arrested by a stop screw 28 which prevents the spring 30 from being exposed and becoming detached from the assembly. The stop screw 28 is positioned on the post 16 such that the collar 20 is able to travel a distance sufficient to engage the tang 24.

The cam 26 performs two functions. The first being to lift the collar 20 as the post 16 is raised and the second being to release the collar at a point which will allow engagement of the collar 20 with the tang 24. As may be seen in FIG. 3, the cam 26 has a lifting surface 36 which operates to lift the collar 20 from its position adjacent the stop screw 28 as the post 16 is raised from the storage position toward the projection position. The cam 26 is designed to lift the collar a distance along the post 16 sufficient to clear the top of the tang 24. The cam 26 is also provided with a drop surface 36 which releases the collar 20 only when the pocket 22 of the collar 20 is positioned over the tang 24.

In operation, starting from the projection position, The handle 40 of the collar 20 is lifted to compress the spring 30 and disengage the pocket 22 from the tang 24. The post 16 is then pivoted forward at least to the position where the bottom flange of the collar 20 passes the drop surface 38 and is positioned above the cam lifting surface 36. At this point, the handle may be released. The post 16 is then pivoted forward until secure in the clip 18. To raise the post 16, the clip 18 is released by bending its outer surface away from the post 16 and the post 16 lifted from the clip 18. As the post 16 continues to be lifted, the bottom flange of the collar 20 comes into contact with the cam lifting surface 36, and the collar 20 is raised from the stop screw 28. When the post 16 reaches the vertical and the collar pocket 22 is positioned over the tang 24, the cam drop surface 38 allows the collar 20 to be urged downwardly by the spring 30 so that the collar pocket 22 engages the tang 24 and retains the post 16 in the projection position.

The invention thus ensures that the post 16 is securely retained in the upright, projection position, and does so automatically as the post 16 is raised from its storage position. Although the present invention has been described with respect to only a single embodiment, many modifications are possible and will be apparent to those skilled in the art. For example, the screws 28 and 32 may be any fastener, such as rivets, which will provide a protrusion from the surface of the post 16 which is sufficiently large to accomplish their purposes. The screws 28 and 32, the spring 30 and the bulge 34 in the collar 20 may be positioned on the face of the post 16 opposite the tang 24 rather than the face shown. Also, although the invention has been described with respect to a transmissive overhead projector, it is equally applicable to other projectors having posts, such as reflective type overhead projectors. It is possible for the spring to be an extension spring disposed to pull the collar toward the tang rather than push the collar. Finally, it is possible to invert the cam, tang and spring with respect to the collar so that the collar is forced toward the pivot point of the post as the post is raised rather than the collar being lifted away from the pivot point.

I claim:

1. A post latching assembly adapted for use with an overhead projector including a post pivotally attached to said projector and movable between a storage position and a projection position, the latching assembly comprising:

a tang attached to said projector;

a collar slidably connected to said post and movable between a position engaging said tang when said post is in said projection position and a position free of engagement with said tang;

biasing means for urging said collar in a direction toward engagement with said tang;

means including a cam attached to said projector for sliding said collar away from said tang-engaging position as said post is moved from said storage position to said projection position and for permitting said collar to slide into engagement with said tang in response to said biasing means when said post has been moved to said projection position.

2. A post latching assembly according to claim 1 further including means for limiting movement of said collar toward said tang.

3. A post latching mechanism according to claim 2 wherein said means for limiting movement is a screw projecting from said post to engage said collar.

4. A post latching mechanism according to claim 1 wherein said biasing means is a compression spring attached to said post.

* * * * *